United States Patent
Kumar et al.

(10) Patent No.: US 9,489,138 B1
(45) Date of Patent: *Nov. 8, 2016

(54) METHOD AND APPARATUS FOR RELIABLE I/O PERFORMANCE ANOMALY DETECTION IN DATACENTER

(71) Applicant: Symantec Corporation, Mountain View, CA (US)

(72) Inventors: Sudhir Kumar, Pune (IN); Venkeepuram R. Satish, Fremont, CA (US); Ashish Karnik, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,786

(22) Filed: Jun. 29, 2015

Related U.S. Application Data

(63) Continuation of application No. 13/871,740, filed on Apr. 26, 2013, now Pat. No. 9,069,819.

(51) Int. Cl.
  *G06F 3/00* (2006.01)
  *G06F 3/06* (2006.01)

(52) U.S. Cl.
  CPC ............ *G06F 3/061* (2013.01); *G06F 3/0619* (2013.01); *G06F 3/0665* (2013.01); *G06F 3/0689* (2013.01)

(58) Field of Classification Search
  None
  See application file for complete search history.

(56) References Cited

U.S. PATENT DOCUMENTS

| | | | | |
|---|---|---|---|---|
| 7,281,171 B2* | 10/2007 | Brown | ............... | G06F 11/0706 710/311 |
| 7,467,263 B2* | 12/2008 | Ozaki | ................... | G06F 3/0613 709/217 |
| 7,752,362 B2* | 7/2010 | Nishimoto | ............ | G06F 3/0611 710/5 |
| 2009/0271535 A1* | 10/2009 | Yamaguchi | ........... | G06F 3/0613 710/18 |
| 2010/0082899 A1* | 4/2010 | Nakajima | ............. | G06F 9/5077 711/114 |
| 2011/0173350 A1* | 7/2011 | Coronado | ............. | G06F 13/385 710/8 |
| 2012/0066449 A1* | 3/2012 | Colgrove | ................ | G06F 3/061 711/114 |
| 2012/0259814 A1* | 10/2012 | Sasaki | ..................... | G06F 3/065 707/645 |

* cited by examiner

*Primary Examiner* — Elias Mamo
(74) *Attorney, Agent, or Firm* — Campbell Stephenson LLP

(57) ABSTRACT

A method and apparatus for reliable I/O performance anomaly detection. In one embodiment of the method, input/output (I/O) performance data values are stored in memory. A first performance data value is calculated as a function of a first plurality of the I/O performance data values stored in the memory. A first value based on the first performance data value is calculated. An I/O performance data value is compared to the first value. A message is generated in response to comparing the I/O performance value to the first value.

20 Claims, 4 Drawing Sheets

214

| | Time Stamp | I/O PV | SA Flag | Weekly Flag | Monthly Flag | Yearly Flag |
|---|---|---|---|---|---|---|
| | 4/1/13, 13:30.00 | 25 mSec | 0 | 0 | 1 | 0 |
| | 4/1/13, 13:20.00 | 50 mSec | 1 | 1 | 1 | 1 |
| | 4/1/13, 13:10.00 | 55 mSec | 1 | 1 | 1 | 1 |
| | 4/1/13, 13:00.00 | 51 mSec | 1 | 1 | 1 | 1 |
| | 4/1/13, 12:50.00 | 19 mSec | 0 | 0 | 1 | 0 |
| | ⋮ | ⋮ | ⋮ | ⋮ | ⋮ | ⋮ |
| | 4/1/13, 13:40.00 | 60 mSec | 0 | 0 | 1 | 0 |
| | 4/1/13, 13:30.00 | 95 mSec | 1 | 0 | 0 | 0 |
| | 4/1/13, 13:20.00 | 60 mSec | 0 | 0 | 0 | 0 |
| | ⋮ | ⋮ | ⋮ | ⋮ | ⋮ | ⋮ |
| | 4/1/12, 13:30.00 | 30 mSec | 0 | 1 | 0 | 0 |
| | ⋮ | ⋮ | ⋮ | ⋮ | ⋮ | ⋮ |

METHOD AND APPARATUS FOR RELIABLE I/O PERFORMANCE ANOMALY DETECTION IN DATACENTER

CROSS-REFERENCE TO RELATED APPLICATIONS

The present patent application is a continuation of co-pending U.S. patent application Ser. No. 13/871,740, filed Apr. 26, 2013, and entitled "Method and Apparatus For Reliable I/O Performance Anomaly Detection in Datacenter," which is hereby incorporated by reference herein, in its entirety and for all purposes.

BACKGROUND OF THE DISCLOSURE

Data centers include multiple components that operate together to provide computing services to clients on request. For example, data centers may include hosts (e.g., server computer systems), which implement software applications that receive requests sent from client computer systems. During the course of processing the client requests, the applications may generate input/output (I/O) transactions including I/O transactions to read data needed to generate responses to the requests. I/O transactions can be transmitted to other components within the data center such as disk arrays via networking equipment that may include switches, routers, bridges, etc.

The performance of applications is an important aspect of data centers. One metric of performance is the time it takes applications to respond to client requests. Short response times are desired. The performance of applications is dependent upon the performance of supporting components within the data center such as switches, disk arrays, etc. Abnormal behavior in the supporting components or application itself, will likely degrade the ability of the application to respond quickly to requests received from client computer systems.

Abnormal behavior may be the result of anyone of many different types of hardware or software problems. A bad disk in RAID storage may lead to slower response times. A switch or a host bust adapter (HBA) port may fail or be slowed by some type of hardware or software failure to the point where little if no data can be transmitted by the switch or HBA port. A cable used to connect a switch to a storage array or server may have deteriorated.

Software or hardware problems with components or connections between components in a data center can lead to an increase in the time it takes for an application to respond to a client request or outright failure to fulfill the client request. If the abnormal behavior within a component such as a switch is detected early, data center administrators can take proactive action to quickly remedy the problem early and avoid performance degradation or function down time when addressing the problem and replacing faulty components at the cost of system and business.

SUMMARY OF THE DISCLOSURE

A method and apparatus for reliable I/O performance anomaly detection is disclosed. In one embodiment of the method, input/output (I/O) performance data values are stored in memory. A first performance data value is calculated as a function of a first plurality of the I/O performance data values stored in the memory. A first value based on the first performance data value is calculated. An I/O performance data value is compared to the first value. A message is generated in response to comparing the I/O performance value to the first value.

BRIEF DESCRIPTION OF THE DRAWINGS

The present disclosure may be better understood, and its numerous objects, features and advantages made apparent to those skilled in the art by referencing the accompanying drawings.

Figure 1:
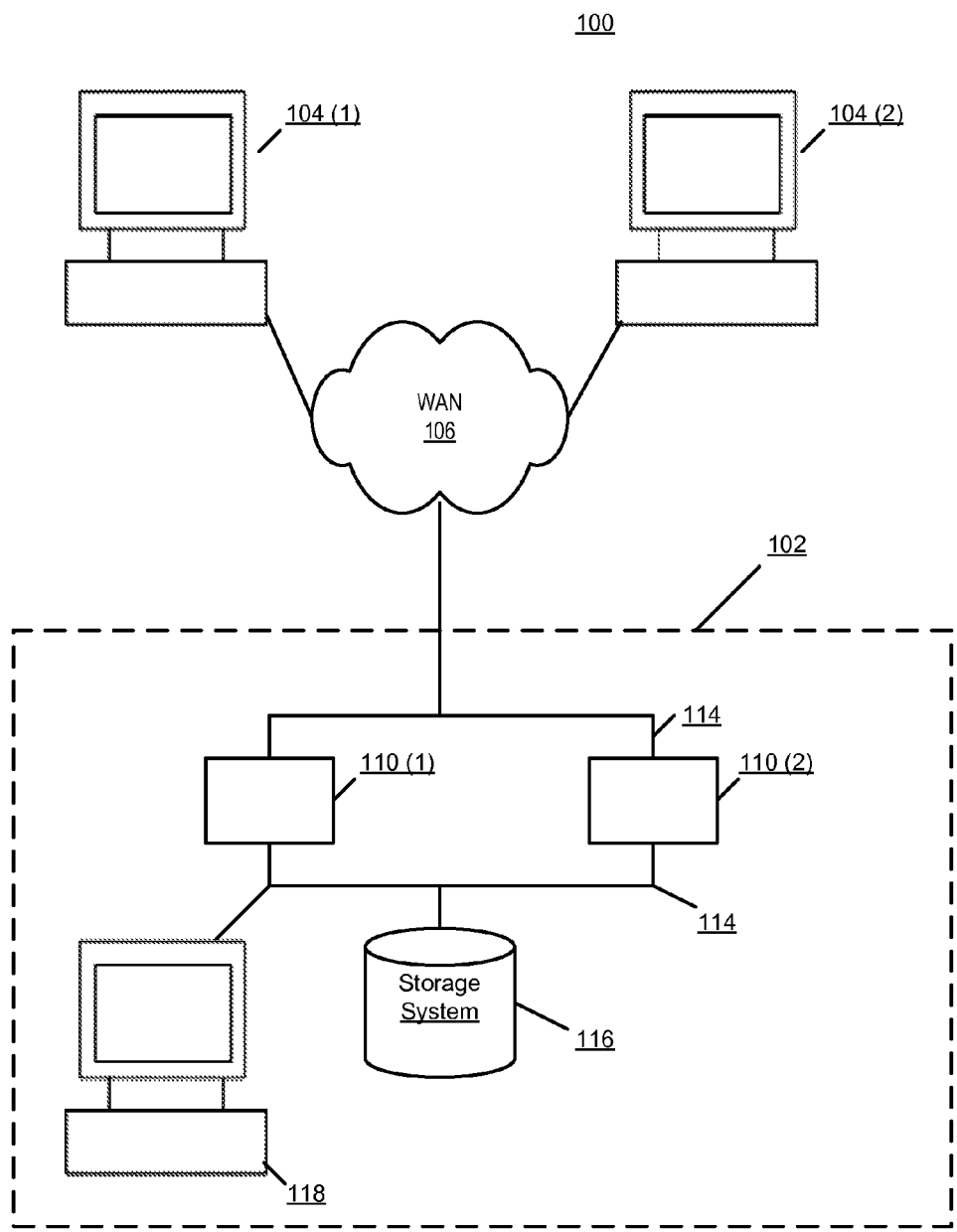
FIG. 1 is a block diagram of an example system configured to implement one or more embodiments of the present disclosure.

While the invention is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Disclosed is a method and apparatus for monitoring and reliably detecting abnormal performance in one or more components within a data center. The present invention will be described with reference to monitoring the performance of components in a data center, it being understood the present invention could be used to monitor and detect abnormal behavior in components of systems other than data centers.

In one embodiment, the present invention can monitor component performance and generate a warning or warnings when one or more components in the data center are not functioning within acceptable I/O performance parameters. Each warning should identify the component that is behaving abnormally. The present invention can be implemented dynamically to avoid the generation of false warnings that might result from, for example, a component receiving an unusually high number of I/O transaction requests in a very short period of time as will be more fully described below.

FIG. 1 illustrates in block diagram form, components of an example system 100 in which one or more embodiments of the present invention can be employed, it being understood that the present invention should not be limited to the Figures or following description. System 100 includes a data center 102 in data communication with client computer systems (clients) 104 via a network 106. Network 106 can be a local area network (LAN) or a wide area network (WAN) such as the Internet. Regardless of the form it takes, network 106 is configured to transmit requests for computing services from clients 104 to data center 102, and the network 106 is configured to transmit responses to respective requests from data center 102 to clients 104. Data centers are significantly more complicated than that shown in FIG. 1. However, for ease of illustration of the present invention only, a simplistic view of an example data center 102 is shown.

Data center 102 includes hosts (e.g., server computer systems or servers) 110 in data communication with storage subsystem 116 via storage area network 114. Each of the servers 110 may include one or more applications that take form in software instructions executing on one or more processors. These applications are configured to process and respond to requests received from client computer systems 104 via network 106. Although not shown, the applications executing on servers 110 may be supported by underlying software applications executing on one or more additional servers within data center 102.

Storage system 116 may include various components such as disk arrays, database management systems, volume managers, RAID controllers, etc., that manage and store data accessible by applications executing on servers 110. Data stored within storage system 116 can be accessed and modified directly or indirectly via I/O transactions generated by the applications.

Storage area network 114 may include components such as switches, routers, bridges, etc., through which I/O transactions generated directly or indirectly by applications executing on servers 110 are transmitted to storage system 116. Direct or indirect I/O transaction responses are likewise transmitted by storage area network 114 to the applications.

FIG. 1 also shows a computer system 118 in data communication with servers 110, storage area network 114, and storage system 116. Computer system 118 is configured to monitor I/O performance of one or more components (e.g., servers 110, applications executing on serves 110, switches in storage area network 114, arrays in storage system 116, etc.) within data center 102 as will be more fully described below.

Figures 2, 3:
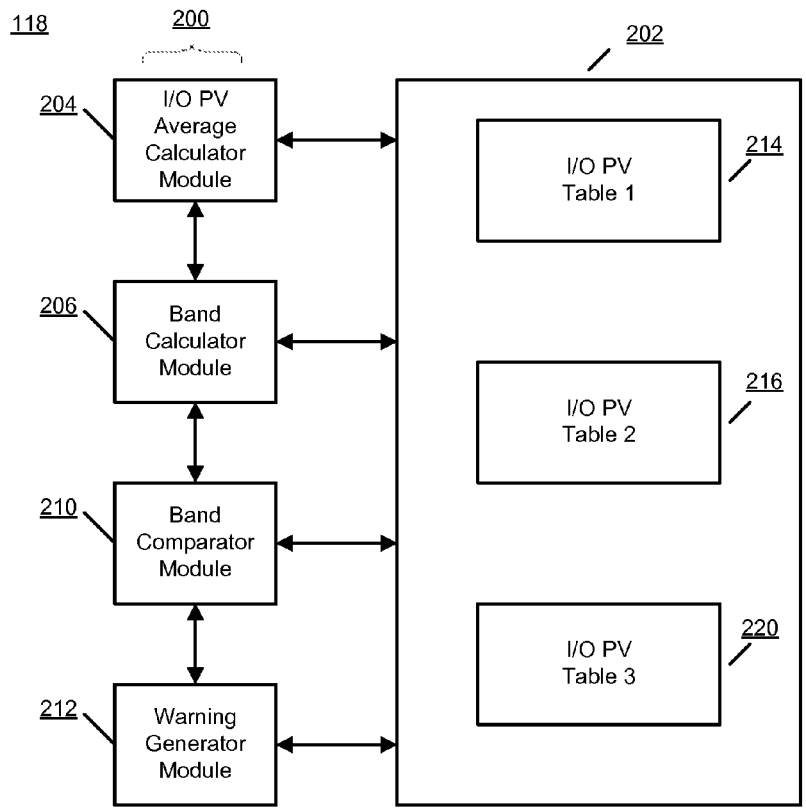
FIG. 2 is a block diagram of an example computer system configured to implement one or more embodiments of the present disclosure.
FIG. 3 is a representation of an example table employed in accordance with one or more embodiments of the present disclosure.

FIG. 2 illustrates in block diagram form, example components employed by computer system 118 in one embodiment. With continuing reference to FIG. 1, computer system 118 includes an anomaly behavior module 200, which in turn includes several underlying modules 204-212 in data communication with memory 202. Each of the modules 204-212 may take form in software instructions executing on one or more processors (not shown) of computer system 118. These instructions may be stored in a memory after being downloaded from an external computer system via network 106.

As noted above, I/O performance of applications executing on servers of a data center is important. That being the case, it becomes important to monitor the I/O performance parameters or values (hereinafter I/O performance values or I/O PV) within components, including the applications themselves, in order to detect abnormal behavior. Computer system 118 shown in FIGS. 1 and 2 can detect abnormal behavior in one or more components using a dynamic thresholding technique. Computer system 118 can generate a warning or warnings when behavior of one or more components is determined to be abnormal. For example, computer system 118 may generate separate warnings that indicate a particular application executing on sever 110(1) and a particular switch in storage area network 114 are behaving abnormally. One of these warnings may indicate that the time it takes the application executing on server 110(1) to respond to client requests is abnormally long, while the other warning may indicate that data throughput of the switch in storage area network 114 is abnormally low. In some instances, the separate warnings may be related, e.g., the slow response time of the application executing on server 110(1) may be caused by the low data transmission rate through the switch in question. Data center administrators can follow up on warnings generated by computer system 118.

Memory 202 includes several tables, each one of which corresponds to a respective component in data center 102. For purposes of explanation only, memory 202 is shown with three tables 214-220. The present invention should not be limited to three tables as shown in FIG. 2. Table 214 may correspond to a disk array (not shown) within storage system 116, table 216 may correspond to an application executing on server 110 (1), and table 220 may correspond to a switch (not shown) within storage area network 114. Each table includes entries that map I/O PVs to time stamps that identify the date and time when the I/O PVs were generated. The entries also map flags, more fully described below, to the I/O PVs and time stamps. Initially, each flag in an entry is in a first state (i.e., logical zero), but may be subsequently set (i.e., switched to logical one) by anomaly behavior module 200 as will be more fully described below.

In one embodiment, the detection of abnormal behavior in components of the data center can be implemented with anomaly behavior module 200 using algorithms employed with Bollinger Band techniques. It is noted that the present invention should not be limited to use of algorithms employed with Bollinger Band techniques. Rather, the present invention can avoid generating a false warning or wrongly classifying normal behavior as abnormal behavior using algorithms other than those employed by the Bollinger Band techniques.

Bollinger Band is a well-known technique used in other fields for detecting abnormal behavior. Bollinger Bands consist of: an N-sample moving average (MA), an upper band at K times an N-sample standard deviation above the moving average (MA+Ks), and a lower band at K times an N-sample standard deviation below the moving average (MA−Ks). Typical values for N and K are 20 and 2, respectively, it being understood that N and K so not be limited thereto. MA can be calculated by adding the N-samples, and dividing the sum by N. Standard deviation s can be calculated as:

$$s = \sqrt{\frac{1}{N-1} \sum_{i=1}^{N} (x_i - \bar{x})^2}$$

The purpose of Bollinger bands is to provide a relative definition of an anomalous sample. By definition, a sample (e.g., I/O PV) is anomalous if the sample exceeds the upper band or falls below the lower band.

Computer system 119 receives I/O PVs from various components at regularly scheduled times (e.g., one I/O PV from a particular component each minute). For example, computer system 118 can receive I/O PVs in the form of data throughput values for a switch in storage area network 114, and computer system 118 can receive I/O PVs in the form of response times or the time it takes, for example, an application executing on server 104(1) to respond to a client requests or the time it takes for a disk array to respond to a I/O transaction request to access data in storage system 116. These I/O PVs are stored within respective tables of memory 202 along with the time stamp that identifies the date and time when the I/O PVs was generated. Thus, table 220 maps time stamps to I/O PVs for the application executing on server 110(1), table 216 maps time stamps to I/O PVs for switch 110(1), and table 214 maps time stamps to I/O PVs for the disk array within storage system 116. As will be more fully described below, tables 214-220 map additional information to respective time stamps. While the present invention can monitor and detect abnormal behavior in several components within data center 102, the present invention will be described with reference to table 214 and the monitoring of behavior in the disk array corresponding thereto, it being understood that the present invention should not be limited thereto.

The anomaly behavior module 200 as noted includes modules 204-212. Anomaly behavior module 200 receives I/O PVs (e.g., I/O request response times) and respective time stamps at regularly scheduled times (e.g., every 10 minutes) for the disk array. Module 200 maps the time stamps to respective I/O PVs in table 214. For each I/O PV it receives, module 200 calculates an N-sample moving average (MA) for the I/O PVs. As noted, N can be any number. Generally, 20 is a good number to use for N. MA is calculated by summing the last N I/O PVs stored within table 214, and dividing the sum by N. Thereafter, module 200 calculates an upper band by adding the MA and Ks (K times the standard deviation s). A lower band may not be needed. It is noted that for components, such as a switch within storage area network 114, module 200 may calculate a lower band in order to detect an anomalous behavior such as low data throughput. An upper band may not be needed to detect anomalous behavior in the switch. Typically when monitoring I/O PVs as time values such as response times, a lower band is not needed, and when monitoring I/O PV as data transmission rates, an upper band is not needed. In other words, low I/O PVs should not trigger a warning of abnormal behavior in a component, such as a disk array, whose performance is measured by response times, and high I/O PVs should not trigger a warning of abnormal behavior in a component, such as a switch, whose performance is measured by transmission rates. Thus, where I/O PVs are response times, there should be no need to compare the I/O PVs with a lower band to detect abnormal behavior; comparing the I/O PVs with an upper band should suffice. Conversely, where I/O PVs are transmission rates, there should be no need to compare the I/O PVs with an upper band to detect abnormal behavior; comparing the I/O PVs with an lower band should suffice.

Module 200 can compare a newly received I/O PV with the calculated upper band to determine whether the disk array is behaving abnormally. If the new I/O PV exceeds the upper band, module 200 may generate a warning indicating the disk array is not functioning properly and should be checked. However, simply comparing a newly received I/O PV with the calculated upper band may result in a false warning that could result when, for example, an unusually high number of I/O transaction requests are received by the properly functioning disk array within a very short period of time, as opposed to the generation of a true warning that could result when, for example, a disk within the disk array fails. Increases in the magnitude the I/O PVs for the disk array may be expected at certain times of the day, or days of the week, month, quarter, or year. Module 200 can take into account expected increases in the magnitude of I/O PVs when generating warnings. In one embodiment, module 200 may process the I/O PVs using significance analysis and/or seasonality analysis to suppress false warnings that could otherwise arise as a result of expected increases in the magnitude of I/O PVs. In one embodiment, using significance analysis module 200 may generate a warning when M (e.g., three) of the I/O PVs generated within a predetermined amount of time exceed their respective upper bands, or when M consecutively generated I/O PVs exceed their respective upper bands. In addition or alternatively, module 200 may generate a warning when M of the I/O PVs generated within a predetermined amount of time exceed their respective seasonal upper bands, or when M consecutively generated I/O PVs exceed their respective seasonal upper bands. As will be more fully described, seasonal upper bands can be calculated using weekly, monthly, yearly, etc., I/O PVs. For purposes of explanation only, it will be presumed that module 200 generates a warning of abnormal behavior by the disk array using both significance analysis and seasonal analysis on a weekly, monthly, and yearly basis as more fully described below.

With continuing references to FIGS. 1 and 2, FIG. 3 illustrates details of an example table 214. It is noted this table maps time stamps to respective I/O PVs and flags, it being understood that the present invention should not be limited to use of the table shown within FIG. 3. Table 214 includes four flags for each entry. The SA flag is set to logical 1 by module 200 when a newly stored I/O PV for the disk array exceeds its upper band. The weekly seasonal flag is set to logical 1 by module 200 if the new I/O PV exceeds a seasonal weekly upper band that was calculated using weekly I/O PVs stored in the table. The monthly seasonal flag is set to logical 1 by module 200 if the new I/O PV exceeds the seasonal monthly upper band that was calculated using monthly I/O PVs. The yearly flag is set to logical 1 by module 200 if the new I/O PV exceeds the seasonal yearly upper band that was calculated using yearly I/O PVs. In one embodiment, if M of the I/O PVs generated within a predetermined amount of time or M consecutively generated I/O PVs exceed their respective upper bands, module 200 will then determine whether the M I/O PVs exceed their respective seasonal weekly, monthly, and yearly upper bands, module 200. If so, module 200 will generate a warning indicating the disk array is behaving abnormally and should be checked by an IT administrator.

Figure 4:
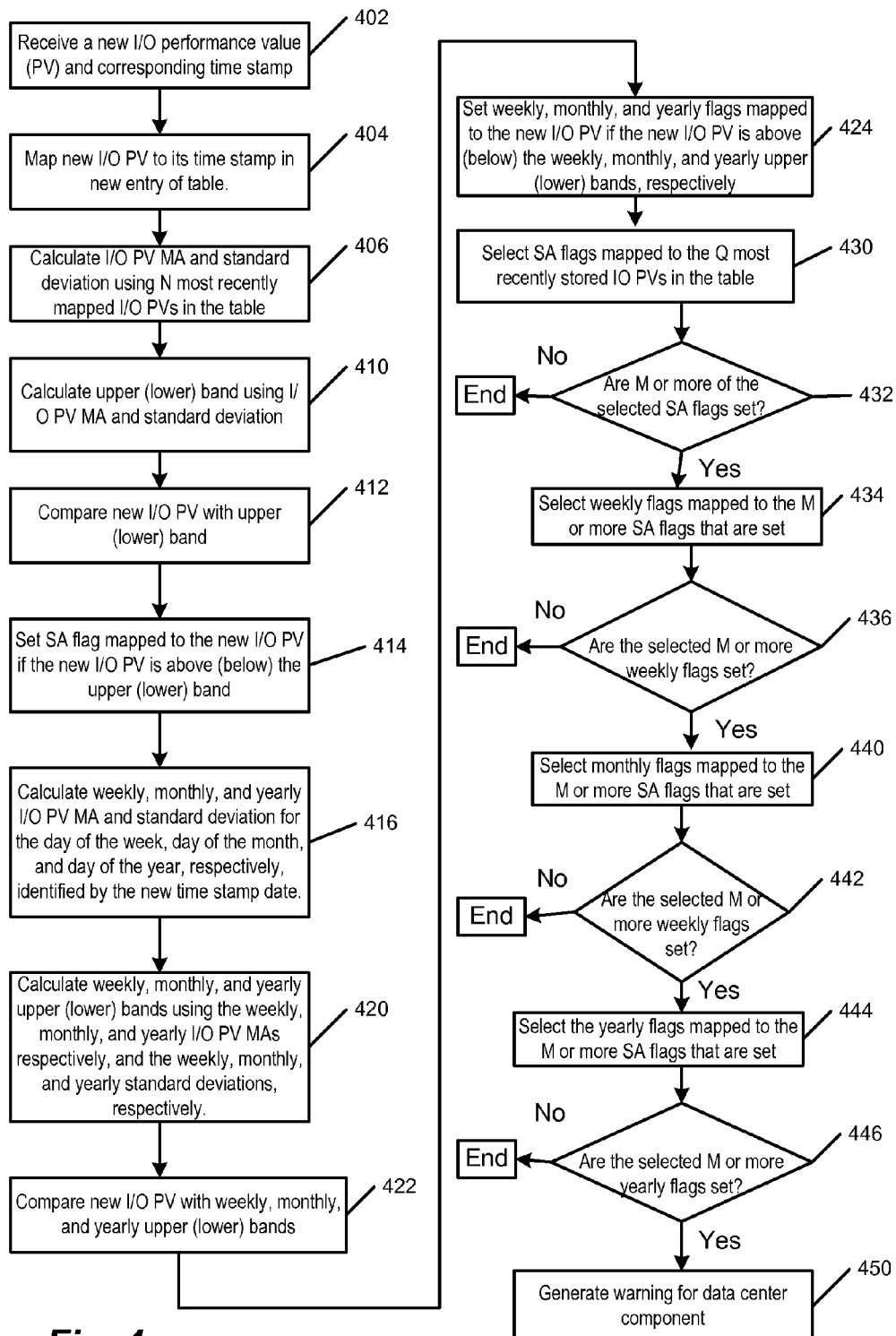
FIG. 4 is a flowchart showing aspects of an example method of monitoring a component of the data center shown in FIG. 1.

FIG. 4 illustrates a flow chart showing an example of the method implemented by module 200 in accordance with one embodiment of the present invention. It is noted that the method of the present invention should not be limited to that shown within FIG. 4. With continued reference to FIGS. 1-3, the method in FIG. 4 starts at 402 when module 200 receives a new I/O PV and corresponding time stamp. At 404, module 200 maps the new I/O PV to its corresponding time stamp in a new entry of table 214. At 406, the I/O PV average calculator module 204 calculates the I/O PV moving average (MA) and/or standard deviation using the N most recently stored I/O PVs within table 214. In one embodiment, calculator module 204 can access and read I/O PVs from table 214 that are needed for calculating the MA or standard deviation. In an alternative embodiment, 404 may be the last act performed by module 200 before a warning is generated or the process otherwise ends without generation of a warning. However, for purposes of explanation only, the present invention will be described with 404 occurring between 402 and 406 as shown.

At 410, band calculator module 206 calculates the upper band using the I/O PV MA and the standard deviation calculated in step 406. Before calculating the band, calculator module 206 may determine whether the I/O PVs represent response times, data transmission rates, or some other measure of component performance. Based on this determination, calculator module 206 may calculate an upper band, a lower band, or both. To illustrate, if the I/O PVs represent response times, calculator module 206 calculates only an upper band for subsequent comparison. But if the I/O PV represents transmission rates, calculator module 206 calculates a lower band for subsequent comparison. In the illustrated example, the I/O PVs represent response times, so band calculator module 206 calculates an upper band only. In step 412, band comparator 210 compares the I/O PV value received in step 402 with the upper band calculated in step 410. Threshold compare module 210 sets the SA flag within the new entry of table 214 and mapped to the new time stamp if the new I/O PV exceeds the upper band. Otherwise, the SA flag remains at logical 0.

Module 200 also performs processing to determine whether the weekly flag, monthly flag, and yearly flag within the new entry of table 214 should be set. Before that determination, the seasonal weekly, monthly, and yearly bands should be calculated. At 416, I/O PV average calculator module 204 calculates the weekly, monthly, and yearly I/O PV MAs and/or standard deviations. In one embodiment, the I/O PV average calculator module 204 calculates the weekly, monthly, and yearly I/O PV MAs and/or standard deviations using prior I/O PVs in table 214 that are mapped to time stamps with times equal to the time stamp time for the new I/O PV received in 402 and dates earlier than the time stamp date for the new I/O PV. For a new I/O PV with a time stamp set to 1:30.00 p.m. (e.g., 13:30.00) on Monday, 4/1/13, calculator module 204 can calculate the weekly I/O PV MA by adding the new I/O PV and the last R (e.g., R=4) I/O PVs stored in table 214 that are mapped to time stamps with times set to 13:30.00 and dates set to Monday, i.e., the 4 I/O PVs with time stamp time set to 13:30.00 and time stamp dates set to Monday, 3/25/13, Monday, 3/18/13, Monday, 3/11/13, and Monday, 3/4/13. The summed result is divided by R or R+1 (e.g., 4 or 5). I/O PV average calculator module 204 can calculate the monthly I/O PV MA by adding the new I/O PV and the last S (e.g., S=4) I/O PVs stored in table 214 that are mapped to time stamp times of 13:30.00 and time stamp dates set to first day of the month, i.e., the 4 I/O PVs with time stamp time set to 13:30.00 and time stamp dates set to 3/1/13, 2/1/13, 1/1/13, and 12/1/12. The summed result is divided by S or S+1 (e.g., 4 or 5). I/O PV average calculator module 204 can calculate the yearly I/O PV MA by adding the new I/O PV and the last T (e.g., T=4) I/O PVs stored in table 214 that are mapped to time stamp time set to 13:30.00 and time stamp date set to April $1^{st}$, i.e, the 4 I/O PVs with time stamp time set to 13:30.00 and time stamp dates set to 4/1/12, 4/1/11, 4/1/10, and 4/1/09. The summed result is divided by T or T+1 (e.g., 4 or 5).

At 420, band calculator module 206 calculates the weekly, monthly, and yearly upper (lower) bands using the weekly, monthly, and yearly I/O PV MAs, respectively, and weekly, monthly, and yearly, standard deviations, respectively, which are also calculated by the band calculator module 206 based upon historical data within table 214. At 422, threshold comparator module 210 compares the new I/O PV with the weekly, monthly, and yearly upper bands, respectively. Band comparator module 210 sets the weekly, monthly, and yearly upper flags within table 214 if the new I/O PV received at step 402 exceeds the weekly, monthly, and yearly upper bands, respectively. Otherwise, these flags remain at logical 0.

After each flag in the new entry in table 214 is set to logical 1 or determined to remain at logical 0, the process can proceed with significance analysis and seasonality analysis. In one embodiment, the significance analysis could begin with warning module 212 selecting the SA flags mapped to the M most recent time stamps in the table. However, significance analysis and seasonality analysis will be explained with reference to the illustrated embodiment in which warning module 212 at step 430 selects the SA flags mapped to the Q most recent time stamps in table 214, it being understood the present invention should not be limited thereto. At 432 warning generator module 212 determines whether M or more of the selected SA flags are set. If less than M of the selected SA flags are set, the process ends and no warning is generated.

If the condition set forth at 432 is satisfied, the process proceeds to seasonality analysis, which in the illustrated embodiment begins at 434 with warning generator module 212 selecting the weekly flags mapped to the M or more SA flags set to logical 1. Warning generator module 212 then determines in step 436 whether all or substantially all (e.g., 80% or more) of the selected weekly upper flags are set. If not set, the process ends. Otherwise the process proceeds to step 440 where warning generator module 212 selects the monthly flags mapped to the M or more SA flags that were determined to be set. Warning generator module 212 determines whether all or substantially all of the selected monthly flags are set. If not set, the process ends. Otherwise the process proceeds with warning generator module 212 selecting the yearly flags mapped to the M or more SA flags that were determined to be set. Warning generator module 212 determines all or substantially all of the selected yearly flags are set. If not set, the process ends. Otherwise warning generator module 212 generates a warning message for display on computer system 118, which indicates the disk array is behaving abnormally and should be investigated. The warning message may also indicate the date and time the message was generated.

It is noted that module 200 may also take into account during its seasonality analysis consideration of holidays that do not fall on a particular set day of the year. For example, Labor Day falls on the first Monday in September every year within the United States. Data centers can expect to receive a significant number of requests for service on the Tuesday following Labor Day. However, Labor Day may fall within any one of the first seven days of September. One of ordinary skill in the art understands that the warning generating module 212 can accommodate seasonality analysis based upon holidays that do not fall on a set day (e.g., Labor Day) each year.

Figure 5:
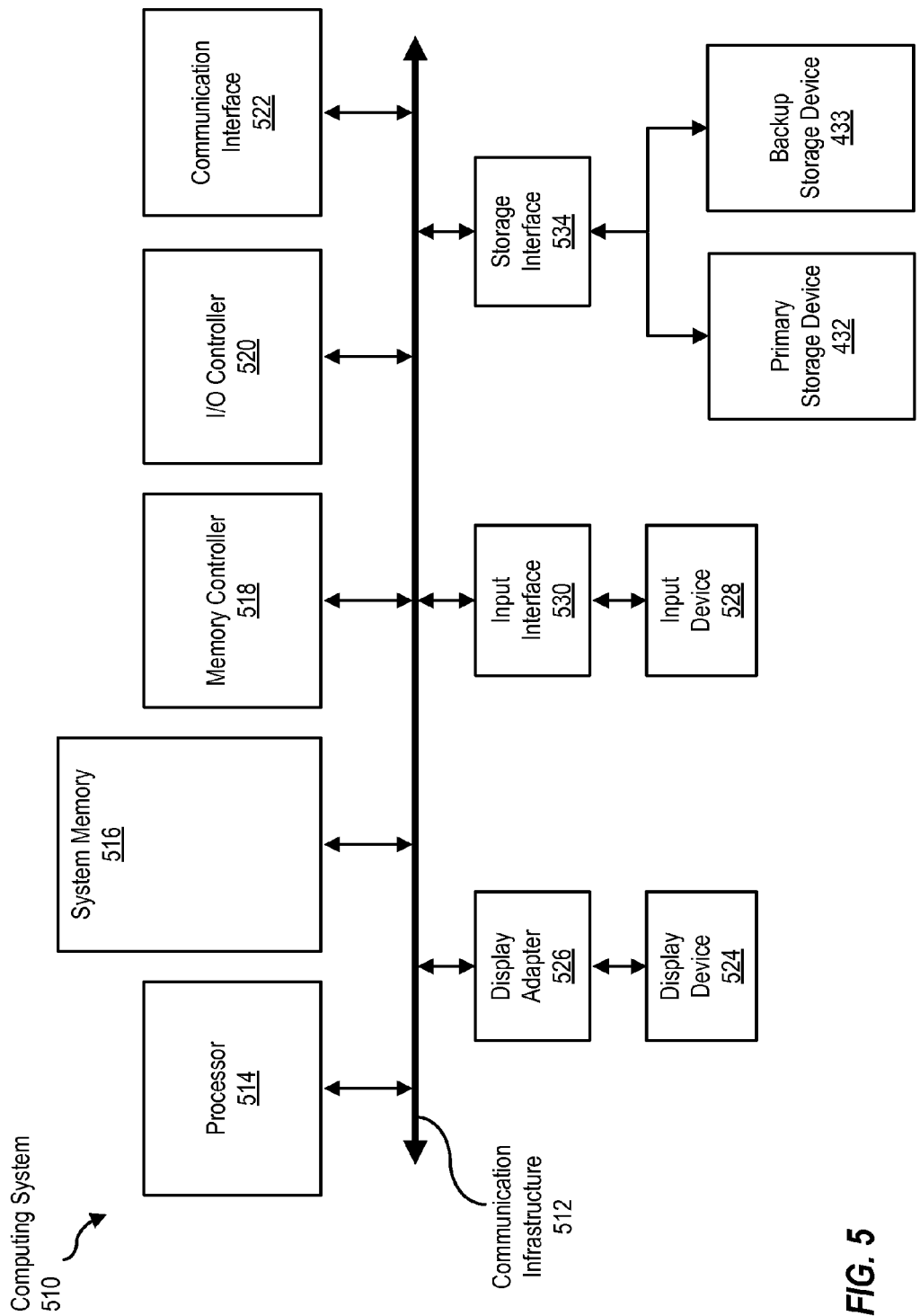
FIG. 5 is a block diagram of a computing device, illustrating how an anomaly behavior module can be implemented in software, according to one embodiment.

FIG. 5 is a block diagram of an example computing system 510, illustrating how anomaly behavior module 200 can be implemented in software, as described above. Computing system 510 broadly represents any single or multiprocessor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and smart phones), and the like. In its most basic configuration, computing system 510 may include at least one processor 514 and a system memory 516. By executing the software instructions that implements anomaly behavior module 200, computing system 510 becomes a special purpose computing device.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, program instructions executable to implement anomaly behavior module 200 may be loaded into system memory 516.

In certain embodiments, computing system 510 may also include one or more components or elements in addition to processor 514 and system memory 516. For example, as illustrated in FIG. 5, computing system 510 may include a memory controller 518, an I/O controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 9, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer) for display on display device 524.

As illustrated in FIG. 5, computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 9 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   storing input/output (I/O) performance data values in memory, wherein
      each of the I/O performance data values comprise
         an amount of time it took for a device to respond to a request from any one of a plurality of other devices, and
      the performance of the device is measured by the amount of time;
   calculating a first performance data value as a function of a first plurality of the I/O performance data values stored in the memory;
   calculating a first value and a second value based on the first performance data value,
      wherein
         the first value is an upper band, and
         the second value is a lower band;
   comparing a new I/O performance data value to the first value and the second value; and
   generating a message in response to comparing the new I/O performance value to the first value and the second value, wherein
      the message includes a warning if the comparison indicates that the new I/O performance value exceeds the first value or falls below the second value.

2. The method of claim 1, wherein
   the device of the plurality of other devices is a disk array, and
   the I/O performance data value of the disk array is a response time.

3. The method of claim 1, further comprising:
   determining that another device of the plurality of other devices is a network switch.

4. The method of claim 3, wherein
   the another device of the plurality of other devices is a network switch, and
   the I/O performance data value of the network switch is a data transmission rate.

5. The method of claim 2, wherein
   comparing the new I/O performance data value to the upper band is used to detect anomalous behavior of the disk array, wherein
      the anomalous behavior indicates that the disk array is not functioning properly.

6. The method of claim 4, wherein
   comparing the new I/O performance data value to the lower band is used to detect anomalous behavior of the network switch, wherein
      the anomalous behavior indicates low data throughput.

7. The method of claim 1, wherein
   the upper band is a seasonal upper band.

8. A system comprising:
   one or more processors; and
   a memory coupled to the one or more processors, wherein
      the memory stores program instructions executable by the one or more processors to:
   store input/output (I/O) performance data values in memory, wherein
      each of the I/O performance data values comprise
         an amount of time it took for a device to respond to a request from any one of a plurality of other devices, and
      the performance of the device is measured by the amount of time;
   calculate a first performance data value as a function of a first plurality of the I/O performance data values stored in the memory;
   calculate a first value and a second value based on the first performance data value,
      wherein
         the first value is an upper band, and
         the second value is a lower band;
   compare a new I/O performance data value to the first value and the second value; and
   generate a message in response to comparing the new I/O performance value to the first value and the second value, wherein
      the message includes a warning if the comparison indicates that the new I/O performance value exceeds the first value or falls below the second value.

9. The system of claim 8, wherein
   the device of the plurality of other devices is a disk array, and the I/O performance data value of the disk array is a response time.

10. The system of claim 8, further comprising:
determining that another device of the plurality of other devices is a network switch.

11. The system of claim 10, wherein
the another device of the plurality of other devices is a network switch, and
the I/O performance data value of the network switch is a data transmission rate.

12. The system of claim 9, wherein
comparing the new I/O performance data value to the upper band is used to detect anomalous behavior of the disk array, wherein
the anomalous behavior indicates that the disk array is not functioning properly.

13. The system of claim 11, wherein
comparing the new I/O performance data value to the lower band is used to detect anomalous behavior of the network switch, wherein
the anomalous behavior indicates low data throughput.

14. A non-transitory computer readable storage medium storing program instructions executable to:
store input/output (I/O) performance data values in memory, wherein
each of the I/O performance data values comprise
an amount of time it took for a device to respond to a request from any one of a plurality of other devices, and
the performance of the device is measured by the amount of time;
calculate a first performance data value as a function of a first plurality of the I/O performance data values stored in the memory;
calculate a first value and a second value based on the first performance data value,
wherein
the first value is an upper band, and
the second value is a lower band;
compare a new I/O performance data value to the first value and the second value; and
generate a message in response to comparing the new I/O performance value to the first value and the second value, wherein
the message includes a warning if the comparison indicates that the new I/O performance value exceeds the first value or falls below the second value.

15. The non-transitory computer readable storage medium of claim 14, wherein the device of the plurality of other devices is a disk array, and the I/O performance data value of the disk array is a response time.

16. The non-transitory computer readable storage medium of claim 14, further comprising:
determining that another device of the plurality of other devices is a network switch.

17. The non-transitory computer readable storage medium of claim 16, wherein
the another device of the plurality of other devices is a network switch,
the I/O performance data value of the network switch is a data transmission rate.

18. The non-transitory computer readable storage medium of claim 15, wherein
comparing the new I/O performance data value to the upper band is used to detect anomalous behavior of the disk array, wherein
the anomalous behavior indicates that the disk array is not functioning properly.

19. The non-transitory computer readable storage medium of claim 17, wherein
comparing the new I/O performance data value to the lower band is used to detect anomalous behavior of the network switch, wherein
the anomalous behavior indicates low data throughput.

20. The non-transitory computer readable storage medium of claim 14, wherein
the upper band is a seasonal upper band.

* * * * *